(12) United States Patent
Shiao

(10) Patent No.: US 7,994,775 B2
(45) Date of Patent: Aug. 9, 2011

(54) MAGNETIC SENSOR

(75) Inventor: Chih-Mao Shiao, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 430 days.

(21) Appl. No.: 12/350,917

(22) Filed: Jan. 8, 2009

(65) Prior Publication Data

US 2010/0171489 A1 Jul. 8, 2010

(51) Int. Cl.
*G01B 7/14* (2006.01)
(52) U.S. Cl. ................................ 324/207.24
(58) Field of Classification Search .......... 324/251, 324/252, 207.24, 207.2, 207.21, 207.22, 324/208, 166, 173, 207.13, 207.25
See application file for complete search history.

(56) References Cited

U.S. PATENT DOCUMENTS

| 6,498,474 B1 * | 12/2002 | Turner | 324/165 |
| 7,705,584 B2 * | 4/2010 | Yokotani et al. | 324/173 |

* cited by examiner

*Primary Examiner* — Huy Phan
*Assistant Examiner* — Tung X Nguyen

(57) ABSTRACT

A magnetic sensor comprises a read head, a position identification scale and a motion identification scale. The read head is provided with a position sensing unit opposite the position identification scale, and a motion sensing unit opposite the motion identification scale. The read head is further provided with a signal processing unit that is connected with the position sensing unit and the motion sensing unit. By such arrangements, the sensing accuracy can be improved, and the material cost can be relatively reduced.

5 Claims, 3 Drawing Sheets

MAGNETIC SENSOR

BACKGROUND OF THE INVENTION

1. Field of the Invention

The present invention relates to a magnetic sensor; and more particularly to a magnetic sensor capable of identifying positions and motions.

2. Description of the Prior Art

In order to identify the displaced position, the existing linear motion devices are normally provided with position identification sensors to sense the position, such as in order to avoid exceeding the travel, they are normally provided with an extra limit sensor, in order to perform origin correction, they must be provided with an extra origin sensor on the travel thereof, and in order to perform the deceleration positioning operation, they must be provided with an extra deceleration sensor. Hence, the above linear motion devices suffer from many problems such as: they need so many sensors that the material cost is correspondingly increased, the installation of the respective sensors is time-consuming and the accumulated installation error will greatly affect the sensing accuracy.

The present invention has arisen to mitigate and/or obviate the afore-described disadvantages.

SUMMARY OF THE INVENTION

The primary objective of the present invention is to provide a magnetic scale capable of identifying positions and motions by using the magnetic principles.

In order to achieve the above objective, a magnetic scale in accordance with the present invention comprises:

A read head is provided with a position sensing unit, a motion sensing unit and a signal processing unit.

A position identification scale is provided with plural magnetic zones that are located corresponding to the position sensing unit of the read head so as to provide position signals to the signal processing unit for identifying the positions.

A motion identification scale is provided with a positive limit identification zone, an origin identification zone, a deceleration identification zone and a negative limit identification zone that are located corresponding to the motion sensing unit of the read head so as to provide motion signals to the signal processing unit for identifying the motions.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

A magnetic sensor in accordance with a preferred embodiment of the present invention comprises a read head 10, a position identification scale 20 and a motion identification scale 30.

Figure 1:
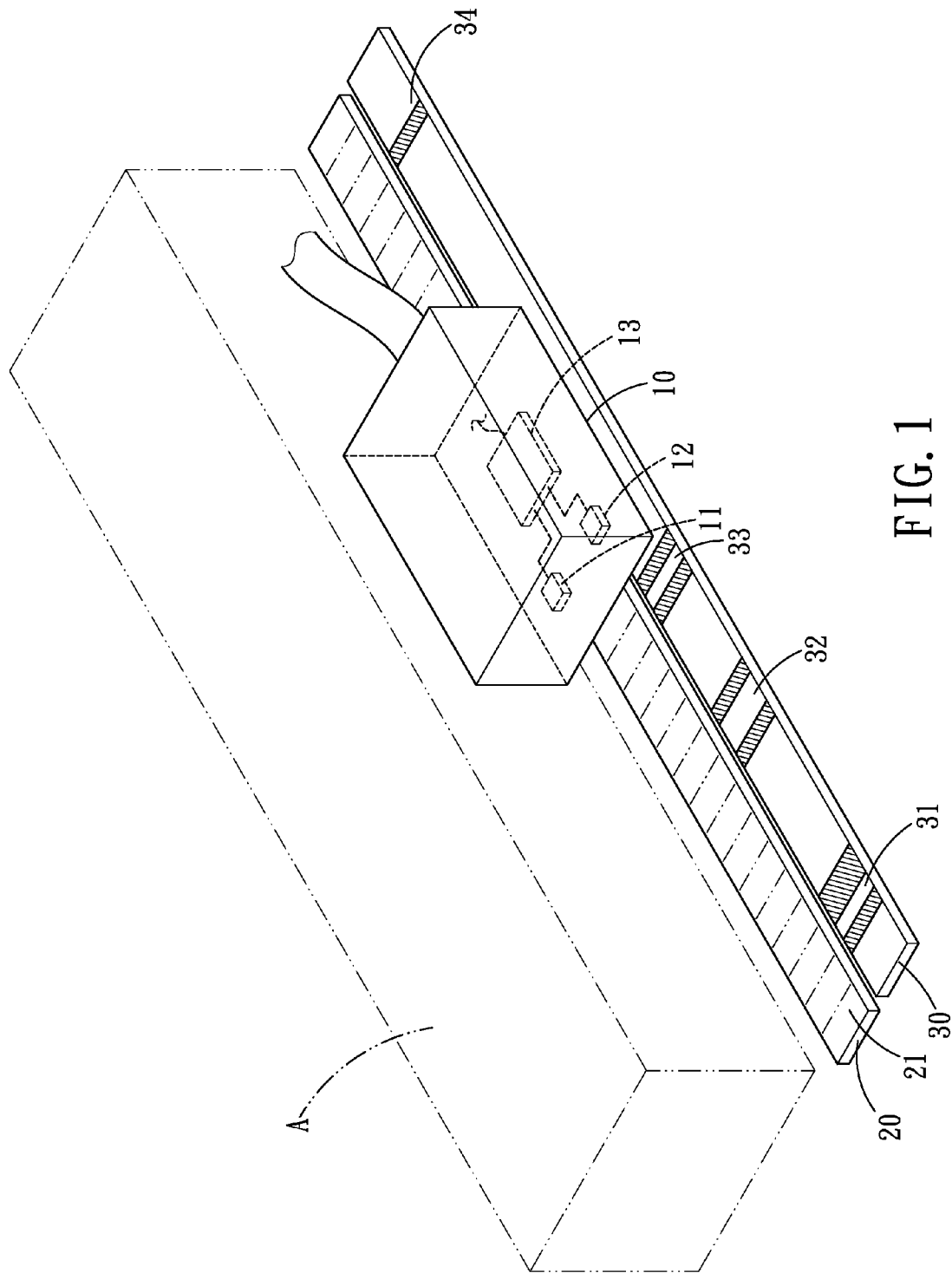
FIG. 1 is a perspective view of a magnetic sensor in accordance with the present invention.
Figure 2:
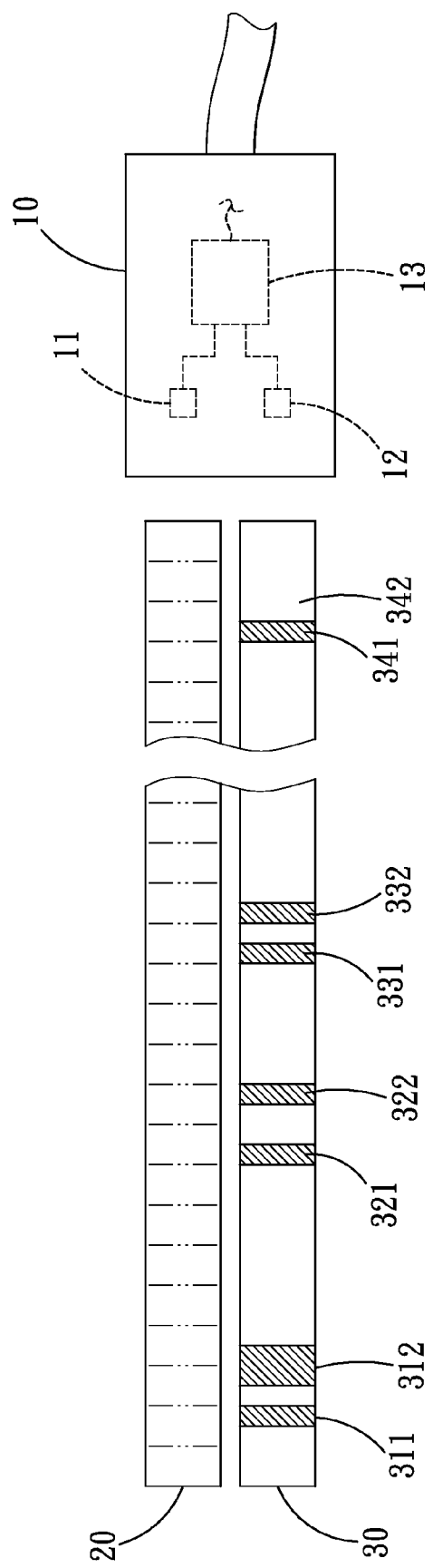
FIG. 2 is a plane view of the magnetic sensor in accordance with the present invention.

The read head 10 (as shown in FIGS. 1-2) is drivingly connected to a power source A. The read head 10 is driven by the power source A to move, and the read head 10 is provided with a position sensing unit 11, and a motion sensing unit 12 on a bottom side thereof. The read head 10 is further interiorly provided with a signal processing unit 13. The signal processing unit 13 is electrically connected to the position sensing unit 11 and the motion sensing unit 12 to process signals.

The position identification scale 20 is provided with plural magnetic zones 21 on a top surface thereof, and each of the magnetic zones 21 includes an N magnetic pole and an S magnetic pole. The N magnetic poles and S magnetic poles are alternately arranged in the extending direction of the position identication scale 20. The position sensing unit 11 of the read head 10 moves relative to the position identification scale 20 to identify positions by sensing voltage variation.

The motion identification scale 30 is disposed at one side of the position identification scale 20 in a parallel manner, so that the extending direction of the position identification scale 20 is parallel to the extending direction of the motion identification scale 30. The motion identification scale 30 is successively provided on a top surface thereof with a positive limit identification zone 31, an origin identification zone 32, a deceleration identification zone 33 and a negative limit identification zone 34 corresponding to the magnetic zones 21 of the position identification scale 20.

Figure 3:
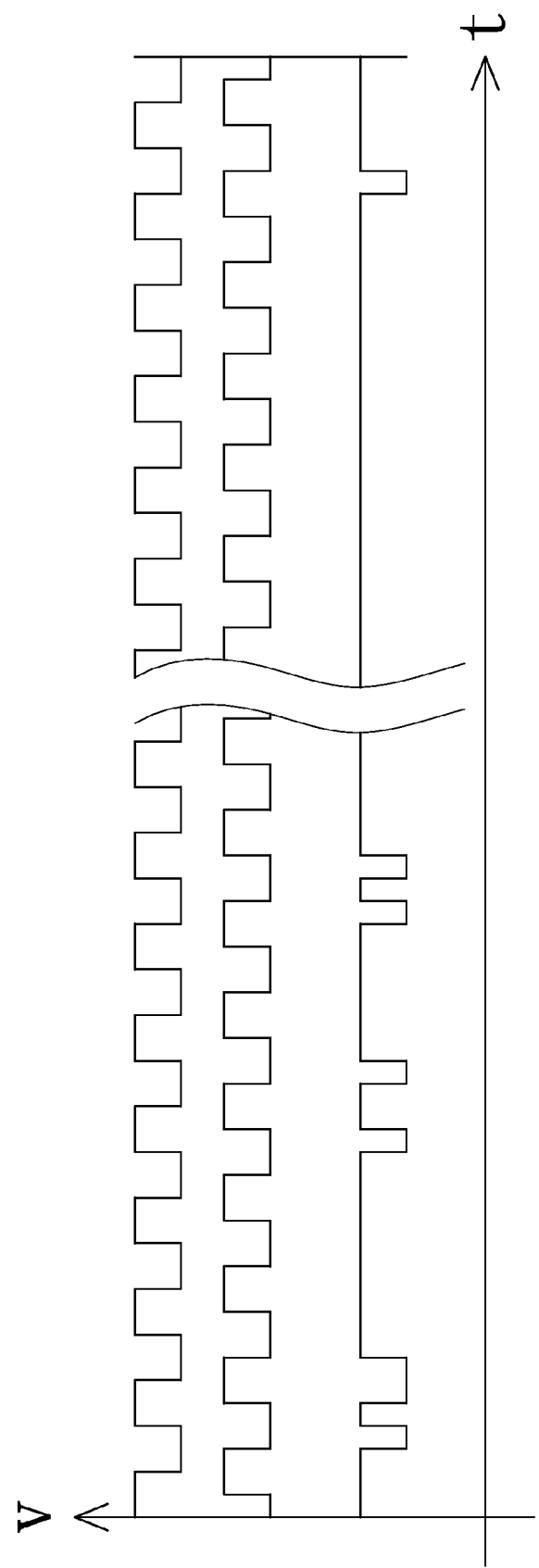
FIG. 3 is a signal schematic diagram of the magnetic sensor in accordance with the present invention.

The positive limit identification zone 31 includes a start section 311 and a movement section 312. The origin identification zone 32 includes a start section 321 and a movement section 322. The negative limit identification zone 34 includes a start section 341 and a movement section 342. The motion sensing unit 12 of the read head 10 moves relative to the motion identification scale 30 to identify motions by sensing the voltage variation (as shown in FIG. 3).

If the motion sensing unit 12 of the read head 10 moves relative to the positive limit identification zone 31 of the motion identification scale 30, when the motion sensing unit 12 reads the start section 311, the signal processing unit 13 of the read head 10 will output a preparation signal, when the motion sensing unit 12 reads the movement section 312, the signal processing unit 13 of the read head 10 will send a positive limit signal to the power source A.

If the motion sensing unit 12 of the read head 10 moves relative to the origin identification zone 32 of the motion identification scale 30, when the motion sensing unit 12 reads the start section 321, the signal processing unit 13 of the read head 10 will output a preparation signal, when the motion sensing unit 12 reads the movement section 322, the signal processing unit 13 of the read head 10 will send an origin signal to the power source A.

If the motion sensing unit 12 of the read head 10 moves relative to the deceleration identification zone 33 of the motion identification scale 30, when the motion sensing unit 12 reads the start section 331, the signal processing unit 13 of the read head 10 will output a preparation signal, when the motion sensing unit 12 reads the movement section 332, the signal processing unit 13 of the read head 10 will send a deceleration signal to the power source A.

If the motion sensing unit 12 of the read head 10 moves relative to the negative limit identification zone 34 of the motion identification scale 30, when the motion sensing unit 12 reads the start section 341, the signal processing unit 13 of the read head 10 will output a preparation signal, when the motion sensing unit 12 reads the movement section 342, the signal processing unit 13 of the read head 10 will send a negative limit signal to the power source A.

The above positive limit identification zone 31, the origin identification zone 32, the deceleration identification zone 33 and the negative limit identification zone 34 are arranged from left to right, but can be changed as desired.

While we have shown and described various embodiments in accordance with the present invention, it is clear to those skilled in the art that further embodiments may be made without departing from the scope of the present invention.

What is claimed is:

1. A magnetic sensor comprising:
    a read head being connected to a power source and including a position sensing unit, a motion sensing unit and a signal processing unit which is connected to the position sensing unit and the motion sensing unit, respectively;
    a position identification scale being provided with plural magnetic zones, the position sensing unit of the read head being employed to sense the magnetic zones of the position identification scale and provide a position signal to the signal processing unit to execute a position identification; and
    a motion identification scale being located parallel to the position identification scale, the motion identification scale being provided with a positive limit identification zone, an origin identification zone, a deceleration identification zone and a negative limit identification zone corresponding to the magnetic zones of the position identification scale, the motion sensing unit of the read head being employed to sense the motion identification scale and provide a motion signal to the signal processing unit to execute a motion identification.

2. The magnetic sensor as claimed in claim 1, wherein the positive limit identification zone includes a start section and a movement section.

3. The magnetic sensor as claimed in claim 1, wherein the origin identification zone includes a start section and a movement section.

4. The magnetic sensor as claimed in claim 1, wherein the deceleration identification zone includes a start section and a movement section.

5. The magnetic sensor as claimed in claim 1, wherein the negative limit identification zone includes a start section and a movement section.

* * * * *